(12) United States Patent (10) Patent No.: US 7,343,064 B2
Koyama et al. (45) Date of Patent: *Mar. 11, 2008

(54) OPTICAL SWITCH AND OPTICAL ADD/DROP MULTIPLEXER

(75) Inventors: Etsuo Koyama, Tokyo (JP); Hiroyoshi Matsumura, Tokyo (JP)

(73) Assignee: Tecdia Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/541,783

(22) Filed: Oct. 2, 2006

(65) Prior Publication Data

US 2007/0211987 A1 Sep. 13, 2007

(30) Foreign Application Priority Data

Mar. 7, 2006 (JP) ............................. 2006-061258

(51) Int. Cl.
 G02B 6/34 (2006.01)
 G02B 6/35 (2006.01)
 G02F 1/13 (2006.01)
(52) U.S. Cl. .......................... 385/16; 385/18; 385/37; 349/193; 349/196
(58) Field of Classification Search ..................... None
 See application file for complete search history.

(56) References Cited

U.S. PATENT DOCUMENTS 5,347,377 A * 9/1994 Revelli et al. ............... 349/193
5,986,740 A * 11/1999 Robinson et al. ........... 349/201

(Continued)

FOREIGN PATENT DOCUMENTS

JP 05-019274 1/1993

(Continued)

OTHER PUBLICATIONS

S. Patel and Y. Silberberg, "Liquid Crystal and Grating-Based Multiple-Wavelength Cross-Connect Switch," IEEE PTL, vol. 7, pp. 514-516, May 1995.

(Continued)

*Primary Examiner*—Rodney Bovernick
*Assistant Examiner*—Omar Rojas
(74) *Attorney, Agent, or Firm*—Pequignot + Myers LLC

(57) ABSTRACT

To provide a wavelength-selection optical switch able to select a light with a certain wavelength and an optical add/drop multiplexer using the same. An optical switch comprising: a silicon substrate; a glass substrate arranged to face a surface of the silicon substrate and having a transparent electrode layer in its opposing surface; a light diffraction reflection layer aligned on a surface of the silicon substrate; a liquid crystal layer aligned between the light diffraction reflection layer and the transparent electrode layer; a silicon substrate electrical terminal extracted from a rear surface of the silicon substrate; and a means for applying voltage between the transparent electrode layer and the silicon substrate electrical terminal; wherein selection of wavelength of light diffracted and reflected by the light diffraction reflection layer is possible by controlling the refraction index of the liquid crystal layer through the voltage. A beam diameter of a wavelength multiplexed light signal is widened by a collimator lens, the wavelength multiplexed light signal with widened beam diameter is directed to the optical switch, a light signal which has wavelength selected through the applied voltage on the optical switch is only diffracted and reflected by the optical switch.

5 Claims, 9 Drawing Sheets

1: variable wavelength optical filter
11a, 11b, 20a, 20b: antireflection layer
12: Si substrate
13: cladding layer (n3)
14: diffraction grating
15: optical guide layer (n1)
25: light diffraction reflection layer
16a, 16b: alignment layer
17: liquid crystal layer (n2)
18: sealing wall
19: transparent electrode layer
21: glass substrate
22: Si substrate side electrical terminal
23: glass substrate side electrical terminal

U.S. PATENT DOCUMENTS

| | | | |
|---|---|---|---|
| 6,215,928 B1* | 4/2001 | Friesem et al. ............... 385/37 |
| 6,778,251 B1 | 8/2004 | Austin et al. |
| 6,804,432 B2* | 10/2004 | Tai .............................. 385/24 |
| 6,999,156 B2* | 2/2006 | Chou et al. ................. 349/196 |
| 2002/0149584 A1 | 10/2002 | Simpson et al. |
| 2005/0237475 A1 | 10/2005 | Chou et al. |
| 2007/0177637 A1* | 8/2007 | Koyama et al. ............. 372/20 |

FOREIGN PATENT DOCUMENTS

| | | |
|---|---|---|
| JP | 05-346564 | 12/1993 |
| JP | 10-209009 | 8/1998 |
| JP | 2002-040469 | 2/2002 |
| JP | 2005-221368 | 8/2005 |
| JP | 2005-311243 | 11/2005 |
| JP | 2005-340321 | 12/2005 |
| WO | WO 2005/064365 | 7/2005 |

OTHER PUBLICATIONS

T. Loukina et al., "Dynamic Spectral Equalizer Using Free-Space Discursive Optics Combined with a Polymer-Dispersed Liquid-Crystal Spatial Light Attenuator," IEEE JLT, vol. 21, pp. 2061002073, Sep. 2003.

J. Wang, et al., "Electrically Tunable Free-Space Sub-Wavelength Grating Filters with 30nm Tuning Range", Optical Society of America, vol. 86, Mar. 23, 2003, pp. 31-32.

* cited by examiner

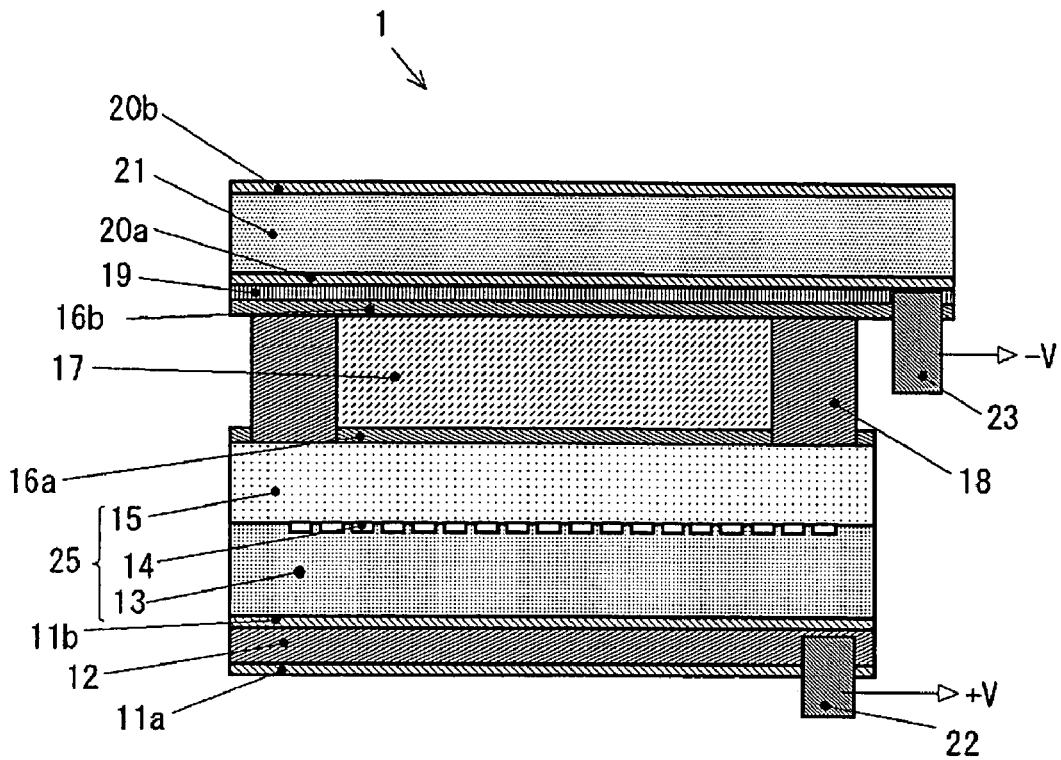

1: variable wavelength optical filter
11a, 11b, 20a, 20b: antireflection layer
12: Si substrate
13: cladding layer (n3)
14: diffraction grating
15: optical guide layer (n1)
25: light diffraction reflection layer
16a, 16b: alignment layer
17: liquid crystal layer (n2)
18: sealing wall
19: transparent electrode layer
21: glass substrate
22: Si substrate side electrical terminal
23: glass substrate side electrical terminal

FIG.1A

OPTICAL SWITCH AND OPTICAL ADD/DROP MULTIPLEXER

BACKGROUND OF THE INVENTION

The present invention is applicable to Wavelength Division Multiplexing (WDM) optical fiber communication, and it relates to a wavelength-selection optical switch for switching between transmission and blocking of a light signal with a certain wavelength, included in a light signal propagating with a plurality of different wavelengths inside an optical fiber, and an Optical Add/Drop multiplexer (OADM) of wavelength selection type for addition (insertion) and/or drop (extraction) of a light signal with a certain wavelength.

In the field of Wavelength Division Multiplexing communication, a wavelength-selection optical attenuator for extracting or inserting a light with a certain wavelength is one of the important devices. As the wavelength-selection optical attenuator, there is a multi-channel wavelength-selection optical attenuator which separates a multiplexed wavelength light exiting from an optical fiber to free space by using a grating (diffraction grating), after attenuating (blocking) a light with a certain wavelength by using a spatial light modulator such as a liquid crystal device, adds again the other light by using a grating, and then directs again to an optical fiber. Further, it is also known that a variable optical attenuator (so-called "wavelength-blocker") can appropriately vary a wavelength to be selected.

FIGS. 7 (a) and (b) illustrate views schematically showing the exemplified configuration of the variable optical attenuator (wavelength blocker) of the prior art.

FIG. 7 (a) shows a wavelength blocker supplied by Xtellus Inc. (U.S.) described in the non-patent document 1. Light exited from a Single Mode Fiber (SMF) 1001 at the input side is collimated by an optical lens 1002, after orienting polarization directions to a certain direction by using a polarization separator or polarization coupler 1003 fabricated using such as calcite, and then separated by a grating 1004. The selected light is focused to a LCD (Liquid Crystal Device) spatial light modulator 1006 by using an optical lens 1005 aligned in the focal plane, and attenuated by a liquid crystal shutter (or a micro-machine shutter) of this LCD spatial light modulator 1006, and thereby eliminated.

Then, the selected light is guided to a single mode optical fiber 1007 at the output side via an optical system symmetrical to that of input side.

Also, FIG. 7 (b) shows a wavelength blocker supplied by Optogone Inc. (FR) described in the non-patent document 2. Although its configuration is essentially the same as the one described in the aforementioned non-patent document 1, the wavelength blocker is made simply by altering the LCD spatial light modulator 1006 to that of the reflection type, and separating the input from the output by using a circulator 1008.

On the other hand, heretofore, an optical fiber which selectively reflects light with a certain wavelength from a wavelength multiplexed light has been known. References such as patent document 1 propose an external-cavity semiconductor laser with a variable wavelength optical filter obtained by using a liquid crystal device. Since the variable wavelength optical filter using the liquid crystal device works by applying a desired voltage, the semiconductor laser includes no mechanical parts, resists the temperature variation and mechanical vibration, has an advantage in the stability of an oscillation wavelength, duty cycle, polarization plane, etc., and operates stably for a long time.

FIG. 8 illustrates views schematically showing the configuration of a variable wavelength optical filter 100 of the prior art: (a) a longitudinal sectional view, and (b) top view.

The variable wavelength optical filter 100 comprises a silicon substrate 112, a glass substrate 121 aligned so as to face the surface of this silicon substrate, with a transparent electrode 119 on the opposing surface. Further, a light diffraction reflection layer 125 is arranged on the surface of the silicon substrate, and a liquid crystal layer 117 is arranged between the light diffraction reflection layer 125 and transparent electrode 119. The liquid crystal layer 117 is sealed by a sealing wall 118 formed around it.

The light diffraction reflection layer 125 includes, in order from the silicon substrate 112, a cladding layer 113, diffraction grating 114, and optical guide layer 115.

In addition, the silicon substrate 112 and glass substrate 121 are covered their respective surfaces with antireflection coatings 111a, 111b and 120a, 120b. Also, each surface of the transparent electrode layer 119 and the optical guide layer 115 contacting with the liquid crystal layer 117 is covered with an alignment film 116a, 116b.

With this configuration of the variable wavelength optical filter, it is possible to control the reflection index by varying the orientation of the liquid crystal layer 117 through changing the voltage applied between the silicon substrate 112 and the transparent electrode layer 119, and as a result vary the wavelength of the light being diffracted and reflected.

As shown in FIG. 8 (a), in a side surface shown in the longitudinal sectional surface, a glass substrate side electrical terminal 123 is extracted from the transparent electrode layer 119 formed on the glass substrate 121, and, in the other side surface, a silicon substrate side electrical terminal 122 is extracted from the front surface of the silicon substrate 112, i.e., the surface of the light diffraction reflection layer 125 side.

Regarding the extraction of the glass substrate side electrical terminal 123, in order to ensure the width w1 for extracting, the glass substrate 121 projects relative to the silicon substrate 112.

On the other hand, regarding the extraction of the silicon substrate side electrical terminal 122, in order to ensure the width w2 for extraction, the silicon substrate 112 projects relative to the glass substrate 121. Although, heretofore, the silicon substrate 112 and light diffraction reflection layer 125 have been manufactured by using the conventional processes for manufacturing the silicon device, the silicon substrate side electrical terminal 122 can only be extracted from the front surface of the silicon substrate 112 in order to ensure the consistency of the manufacture processes.

The concrete reason is as follows. Heretofore, in the process for forming the silicon substrate side electrical terminal 122, alignment marks (such as projection and concave) formed on the front surface of the silicon substrate is used (see patent documents 2, 3, etc.). These alignment marks are utilized for a variety of processes such as a process for forming patterns on a surface of the silicon substrate. On the other hand, since the thickness of the silicon substrate is thick, it is difficult to detect the alignment marks formed on the front surface by the observation from the rear surface using a visual light. Therefore, heretofore, it has been inevitable to extend the silicon substrate side electrical terminal 122 from the front surface of the silicon substrate 112.

However, in recent years, in order to perform FMEA (Failure Mode and Effect Analysis) of the semiconductor devices formed on the silicon substrate, a method was proposed for detecting marks such as alignment marks formed on the front surfaces of the silicon substrate by projecting an infrared beam from the rear surface (see patent documents 4, 5, etc.).

In the patent document 4, an apparatus is disclosed which has a light source outputting an infrared beam with a wavelength region transmitting through the silicon substrate, captures images of a first reflection beam from the rear surface when projecting an output beam from the light source to the rear surface of the substrate and a second reflection beam from inside the substrate and the front surface reflected after the transmission into the substrate, and obtains observed data on the reflection position by numerically processing each image data.

Also, in the patent document 5, observation of semiconductor devices formed on the front surface from rear surface side is realized by using a silicon substrate, through which infrared transmits, and separately aligning semiconductor devices, which work as alignment means, formed on surface of the substrate such that each separation is less than or equal to half of the minimum observation scope of a FMEA system and more than or equal to 3 semiconductor devices are aligned in the observation scope.

[Patent document 1] Japanese Patent Application Laid-Open Publication No. 05-346564

[Patent document 2] Japanese Patent Application Laid-Open Publication No. 10-209009

[Patent document 3] Japanese Patent Application Laid-Open Publication No. 2005-340321

[Patent document 4] Japanese Patent Application Laid-Open Publication No. 2005-221368

[Patent document 5] Japanese Patent Application Laid-Open Publication No. 2005-311243

[Non-patent document 1] S. Patel and Y Silberberg "Liquid crystal and Grating-based multiple-wavelength cross-connect switch," IEEE PTL vol. 7, pp. 514-516 1995

[Non-patent document 2] "Dynamic spectral equalizer using free-space discursive optics combined with a polymer-dispersed LC spatial light attenuator," IEEE JLT vol. 21 pp. 2061002073, 2003

Although the wavelength blocker described in the aforementioned non-patent document 1 has good extinction properties with more than or equal to 40 dB, the light signal to be blocked is merely extinguished and impossible to be extracted outside. Namely, it doesn't work as an optical switch which can adequately switch between transmission and block of a signal with a certain wavelength. In addition, since many elements are included and their positioning is time consuming, the blocker is not practical.

The wavelength blocker described in the non-patent document 2 can't work as an optical switch, as it cannot extract a light signal to be blocked. Therefore, in order to compose the optical add/drop multiplexer, an add port of 3 dB coupler and drop port of 3 dB become necessary, and thus the configuration of the circuit is complicated, and the add/drop multiplexer is not practical for use.

In addition, since the variable wavelength optical filter of the prior art, as shown in the top view in FIG. 8 (b), has a large height (short side of a rectangular shape) of about 5 mm and a wide width (long side of the rectangular shape) of about 7 mm, the housing size of the external-cavity semiconductor laser obtained by using this variable wavelength optical filter is large with a height of about 12 mm and a width of about 16 mm.

Presently, a next generation optical communication system for 10 GHz communication has been developed, however, a transponder to be applied to its Truck line is designed compact, the size of a housing of the external-cavity semiconductor laser to be assembled in the system is restricted by the size of the transponder used in the optical communication system, and is inevitable to be less than 9 mm in height and 13 mm in width. In addition, in order to operate the semiconductor laser efficiently, it is used under the temperature control at a temperature of about 50 deg., and it becomes inevitable to make the size of the housing of the external-cavity semiconductor laser less than the aforementioned size, which is also necessary to increase the efficiency of the temperature control. Further, it is necessary to ensure spaces inside the housing of the external-cavity semiconductor laser, for setting a Peltier device for temperature control and a stem for mounting parts, extracting electrodes to be connected to such as a semiconductor laser and variable wavelength optical filter, and fixing these parts. By considering the thickness of the housing, a height of no more than 3 mm and a width of no more than 4.5 mm are strongly desired for the variable wavelength optical filter.

However, as shown in FIG. 8 (a), the variable wavelength optical filter 100 of the prior art is formed by sealing the liquid crystal layer 117 with the sealing wall 118 between the silicon substrate 112 and the glass substrate 121, and the width of the sealing wall 118 must be more than or equal to 0.5 mm by the restriction from manufacturing technology. In addition, by the restriction from the technology of cutting or cleavage, more than or equal to 0.2 mm is necessary for a width of a margin for cutting, from the sealing wall 118.

Further, due to manufacture technology restrictions for connecting a copper wire of, for example, 0.5 mm diameter to the silicon substrate side electrical terminal 122 and glass substrate side electrical terminal 123, more than or equal to 0.6 mm is necessary for the width of the electrical terminal, and due to restrictions in the technology of the cutting or cleavage of a glass substrate and silicon substrate, more than or equal to 0.2 mm is necessary for the width of margins from the silicon substrate side electrical terminal 122 and glass substrate side electrical terminal 123. In this case, more than or equal to 0.8 mm is necessary for both widths w1 and w2 shown in FIG. 8 (a).

Hereupon, if the silicon substrate side electrical terminal 122 is extracted from the rear surface of the silicon substrate 112, the width w2 shown in FIG. 8 (a) becomes unnecessary, however, it is extremely difficult to extract an electrical terminal from the rear surface of the silicon substrate 112 as mentioned above.

Moreover, by the restriction from the fact that the effective area width (to be described below referring to FIG. 3) along the plane of the light diffraction reflection layer 125 is shaded by the sealing wall 118, more than or equal to 0.2 mm is necessary for a gap between the effective area and the sealing wall 118.

Therefore, in order to satisfy the aforementioned entire dimensional requirement, a height of at least 3.3 mm and a width of at least 5.3 mm are necessary for the conventional variable wavelength optical filter.

As described hitherto, with a conventional configuration of the variable wavelength optical filter, it is extremely difficult to miniaturize to the sizes with a height less than or equal to 3 mm and a width less than or equal to 4.5 mm. On this, although it was tried to simply reduce the width of the sealing wall to 0.2 mm, the manufacturing yield dropped owing to extreme reduction of the strength of the sealing wall, and thereby the optical filter was not practical to use.

The present invention is performed by considering the aforementioned problem of the prior art, and the objective of the present invention is to provide a wavelength-selection variable optical switch which can variably attenuate a light with a certain wavelength, has a switching functionality which is able to extract a light to be extinguished, and is miniaturized to the size with a height of less than or equal to 3 mm and a width of less than or equal to 4.5 mm. In addition, it is also the objective to provide an optical add/drop multiplexer by using this optical switch.

SUMMARY OF THE INVENTION

The aforementioned objective is achieved by the following configurations.

(1) According to the claim 1, there is provided an optical switch comprising: a silicon substrate; a glass substrate arranged to face a surface of the silicon substrate and having a transparent electrode layer in its opposing surface; a light diffraction reflection layer aligned on a surface of the silicon substrate; a liquid crystal layer aligned between the light diffraction reflection layer and the transparent electrode layer; a silicon substrate electrical terminal extracted from a rear surface of the silicon substrate; and a means for applying voltage between the transparent electrode layer and the silicon substrate electrical terminal; wherein selection of wavelength of light diffracted and reflected by the light diffraction reflection layer is possible by controlling the refraction index of the liquid crystal layer through the voltage.

(2) According to the claim 2, there is provided an optical switch of claim 1, wherein its height is less than or equal to 3 mm, and its width is less than or equal to 4.5 mm, (3) According to the claim 3, there is provided an optical add/drop multiplexer which comprises: a collimator lens for widening a beam diameter of a wavelength multiplexed optical signal; and the optical switch of claims 1 or 2 for receiving the wavelength multiplexed optical signal with widened beam diameter; wherein only the optical signal with wavelength selected depending on a voltage applied to the optical switch from the wavelength multiplexed optical signal is diffracted and reflected by the optical switch.

(4) According to the claim 4, an optical add/drop multiplexer which comprises: a first collimator lens for widening a beam diameter of a wavelength multiplexed optical signal; a second collimator lens for widening a beam diameter of an optical signal with a certain wavelength; and the optical switch of claims 1 or 2 for receiving the wavelength multiplexed optical signal with widened beam diameter and the optical signal with a certain wavelength; wherein the optical signal with the certain wavelength is diffracted and reflected by setting the voltage applied to the optical switch in order to select the certain wavelength; and the optical signal with the certain wavelength is joined to the wavelength multiplexed optical signal.

(5) According to claim 5, there is provided an optical add/drop multiplexer of claims 3 or 4, wherein the collimator lens widens the beam diameter to more than or equal to 1.3 mm.

The optical switch of claims 1 or 2 is arranged such that, in order to select the wavelength of the light to be diffracted and reflected, the silicon substrate side electrical terminal is extracted from the rear surface of the silicon substrate as one of the electrical terminals for applying voltage to the liquid crystal layer. Thereby, the width (w2 shown in FIG. 8(*a*)), which is necessary for extracting the silicon side electrical terminal from a (front) surface of the silicon substrate heretofore, becomes unnecessary, and the corresponding width of the silicon substrate can be reduced. Thereby, the whole optical switch can be miniaturized, and in the case of being assembled in the add/drop multiplexer, it is possible to compact the whole apparatus.

According to the optical add/drop multiplexer of any one of claims 3-5, it is realized to extract and insert light with a certain wavelength from the wavelength multiplexed optical signal with a simple configuration by using the small optical switch of claims 1 or 2. According to the optical switch of claims 1 or 2, since the wavelength selection is performed by controlling the refraction index of the liquid crystal, it is possible to resist, e.g., temperature variation and mechanical vibration, and to realize long-term stability.

BRIEF DESCRIPTION OF THE DRAWINGS

FIG. 1A illustrates a longitudinal sectional view schematically showing a configuration of a variable wavelength optical filter 1 according to the present invention.

DETAILED DESCRIPTION OF THE PREFERRED EMBODIMENTS

Hereinafter, referring to the accompanying drawings, descriptions are made on embodiments according to the present invention.

As described above, with the configuration of the conventional variable wavelength optical filter, it is extremely difficult to miniaturize to the sizes with a height less than or equal to 3 mm and a width less than or equal to 4.5 mm. One of the reasons is that, as shown in the configurational view in FIG. 8, the silicon substrate side electrical terminal is extracted from the front surface of the silicon substrate. This is caused by the fact that, as described above, it is difficult to recognize alignment marks formed on the front surface of the silicon substrate from the rear surface side.

However, by the recent development of the processes for manufacturing silicon devices, particularly, the development of technology for reading the alignment marks formed on the silicon substrate from the rear surface with infrared (see the patent documents 4 and 5), it has become possible to extract a silicon substrate side electrical terminal from the rear surface of the silicon substrate. Thereby, it is possible to considerably miniaturize by employing the configuration that allows, as shown in FIG. 1A, to extract the silicon substrate side electrical terminal from the rear surface of the silicon substrate.

Figure 1B:
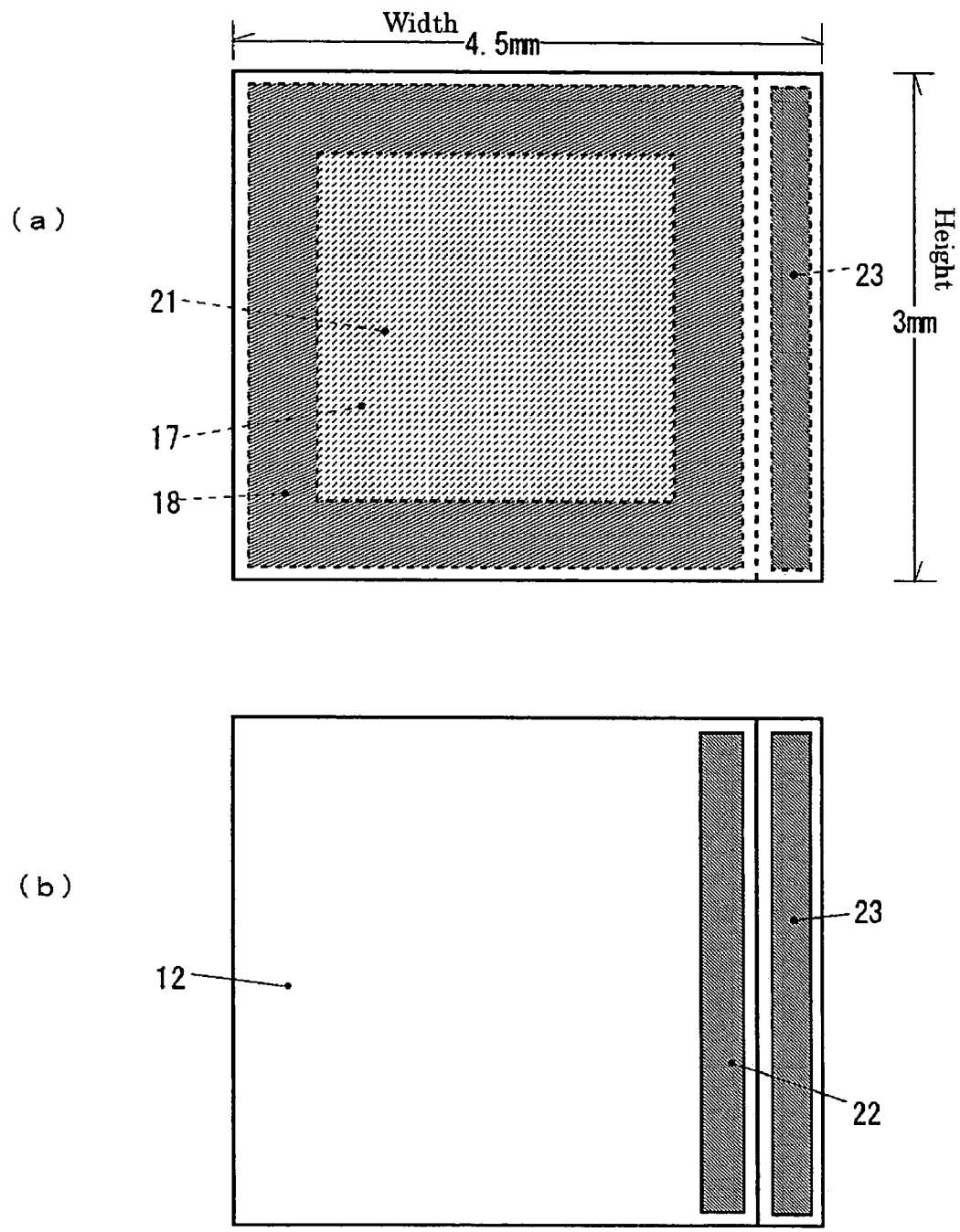
FIG. 1B (a) illustrates the corresponding top view, and FIG. 1B (b) illustrates the corresponding bottom view.

FIG. 1A illustrates a longitudinal sectional view schematically showing a configuration of a variable wavelength optical filter 1 according to the present invention (the longitudinal dimension is exaggerated). FIG. 1B (a) illustrates the corresponding top view, and FIG. 1B (b) illustrates the corresponding bottom view.

The variable wavelength optical filter 1 comprises a silicon substrate 12, and a glass substrate 21 arranged to face the surface of this silicon substrate 12 and having a transparent electrode layer 19 in its opposing surface. Further, a light diffraction reflection layer 25 is aligned on the surface of the silicon substrate 12, and a liquid crystal layer 17 is aligned between the light diffraction reflection layer 25 and transparent electrode layer 19. The liquid crystal layer 17 is sealed by the sealing wall 18 formed around it.

The light diffraction reflection layer 25 includes a cladding layer 13, a diffraction grating 14 and an optical guide layer 15, arranged in the order from the silicon substrate 12.

In addition, the silicon substrate 12 and the glass substrate 21 are covered each surface with the antireflection coatings 11a, 11b, and 20a, 20b, respectively. Also, each surface of the transparent electrode layer 19 and optical guide layer 15, touching the liquid crystal layer 17, is covered with an alignment film 16a, 16b.

With the variable wavelength optical filter 1 of this configuration, it is possible to control the refraction index by varying the orientation of the liquid crystal layer 17 through the application of voltage between the silicon substrate 12 and transparent electrode layer 19, and thereby to vary the wavelength of a light being diffracted and reflected.

As shown in FIG. 1A, in a side surface shown in the longitudinal sectional surface, a glass substrate side electrical terminal 23 is extracted from the transparent electrode layer 19 formed on the glass substrate 21, and, in the vicinity of the same side surface, a silicon substrate electrical terminal 22 is extracted from the rear surface of the silicon substrate 12, i.e., the surface opposite to that of the light diffraction reflection layer 25 being formed.

Figure 8:
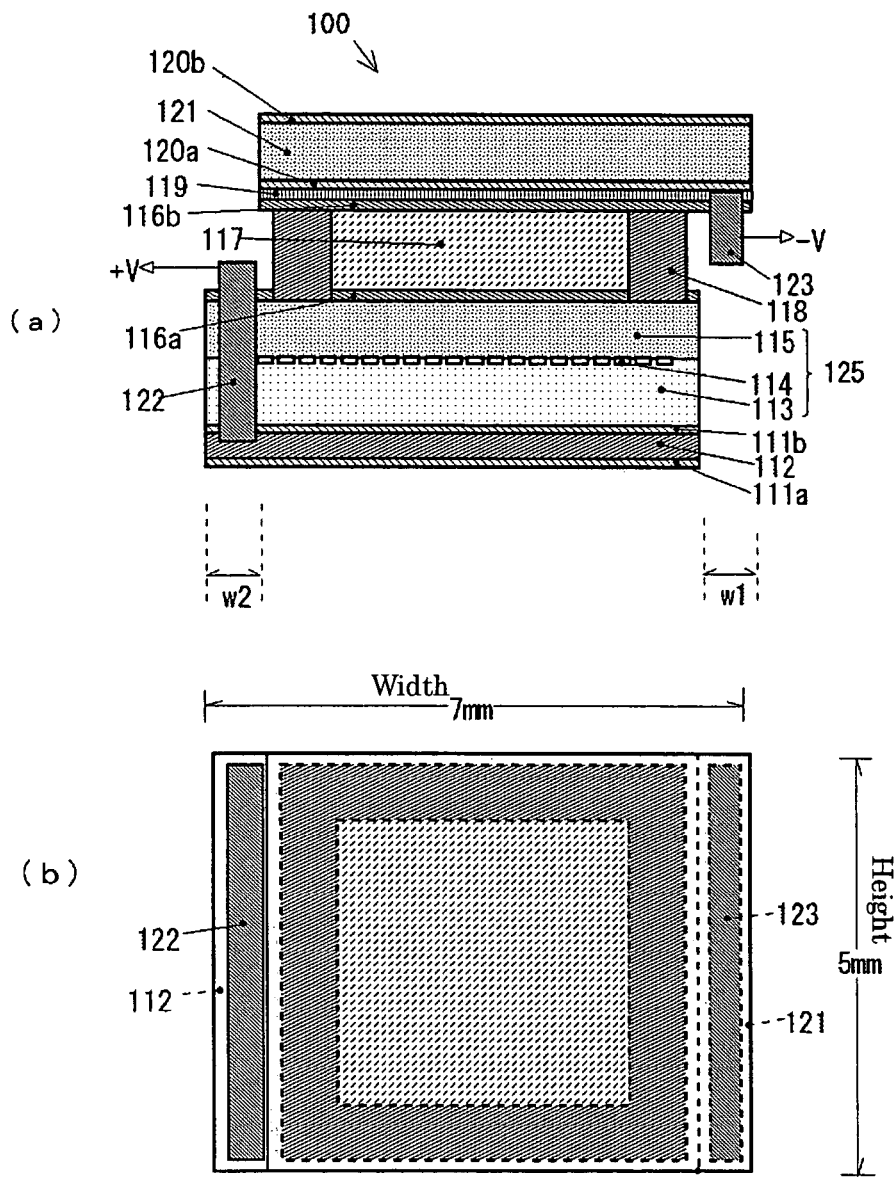
FIG. 8 illustrates views schematically showing an configuration of a variable wavelength optical filter of the prior art: (a) a longitudinal sectional view, and (b) top view.

Regarding the extraction of the glass substrate side electrical terminal 23, in order to ensure a width for extraction similar to the prior art shown in FIG. 8 (a), the glass substrate 21 projects relative to the silicon substrate 12.

On the other hand, since the silicon substrate side electrical terminal 22 is extracted from the rear surface of the silicon substrate 12, being different from the prior art shown in FIG. 8 (a), it is unnecessary to provide the silicon substrate 12 to project relative to the glass substrate 21, and possible to reduce the width of the variable wavelength optical filter correspondingly. That is, being different from the prior art, in the longitudinal sectional surface, it is possible to align the silicon substrate side electrical terminal 22 inside relative to the outer edge of the sealing wall 18. Hereupon, in principle, if it is the rear surface of the silicon substrate 12, it is possible to provide with the silicon substrate side electrical terminal 22 on the desired position of the rear surface except for the area where light reflects or transmits. With this, miniaturization of the variable wavelength optical filter according to the present invention is realized to the size of 3 mm in height and 4.5 mm in width.

The variable wavelength optical filter 1 shown in FIGS. 1A and 1B is fabricated almost as follows.

The antireflection layers 11a, 11b are formed on the both surfaces of the silicon substrate 12, then a cladding layer 13 consisting of a dielectric film with a refraction index of n3 and a thickness similar to the wavelength is formed, and a diffraction grating 14 with a period of .LAMDA. is formed on the outer surface so as to have a shape of stripe. The period .LAMDA. of this diffraction grating 14 is determined, in order to allow to diffract and reflect a light with a desired wavelength, to satisfy the so-called Bragg reflection condition. After forming the diffraction grating 14 consisting of the dielectric film with a shape of stripe, the optical guide layer 15 is formed by depositing a dielectric film with diffraction index of n1 (n1>n3). The thickness of the optical guide layer 15 is determined, so as to satisfy a so-called condition for single mode transmission for transmitting only a light mode with a length .lamda. desired to be reflected by this optical guide layer 15, depending on a refraction index n3 of the cladding layer 13, a refraction index n1 of the optical guide layer 15, and a refraction index n2 (n1>n2>n3) of the liquid crystal layer 17 to be formed hereafter.

Next, in order to form an ohmic contact to the silicon substrate 12, grooves for forming electrodes are formed by etching the silicon substrate 12, and a metal film for the silicon substrate side electrical terminal 22 is embedded thereon. Next, the alignment film 16a for orienting the liquid crystal is formed on the front surface of the so processed substrate, and thereon the sealing wall 18 with a height and width both similar to the wavelength is formed. Subsequently, it is covered with the glass substrate 21 which is formed an antireflection layer 20a, transparent 19 and alignment film 16b on a surface and an antireflection layer 20b on the other surface, liquid crystal with a reflection index n2 (n1>n2>n3) is filled to the gap formed between the silicon substrate 12 and glass substrate 21, and the inlet is sealed by covering with a sealant for sealing wall 18. Further, a metal film for the glass substrate side electrical terminal 23 is also provided. Finally, the glass substrate 21 and silicon substrate 12 are cut to have a desired size.

By applying voltage between the silicon substrate side electrical terminal 22 and glass substrate side electrical terminal 23 of the variable wavelength filter 1 so fabricated, the orientation of liquid crystal molecules change, and as a result the refraction index n2 of the liquid crystal varies depending on the change of the orientation of the liquid crystal molecules. Thereby, it is possible to freely select the wavelength of the C band and L band, which are optical communication bands of the wavelength division multiplexing.

Figure 2:
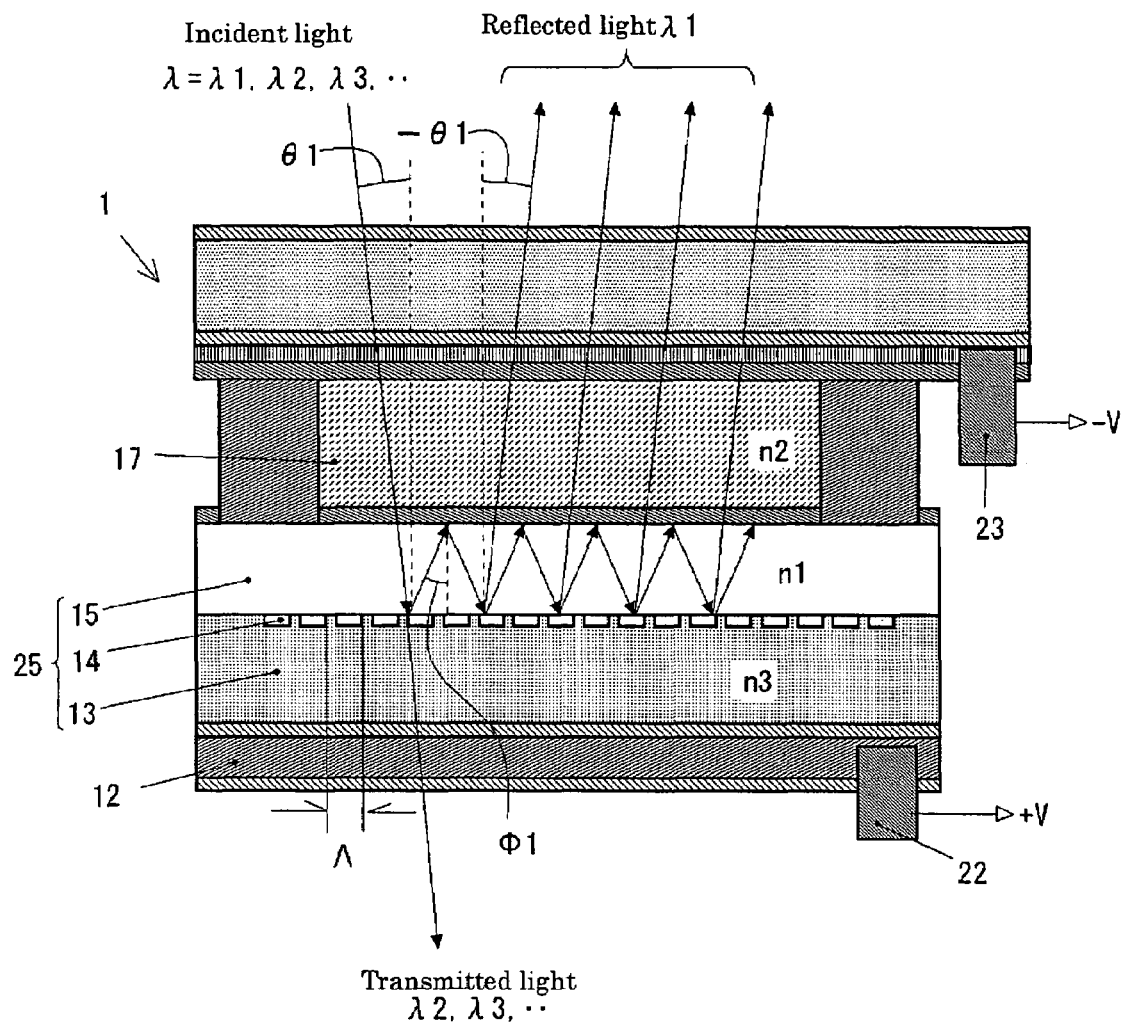
FIG. 2 illustrates a view for explaining operation principle of the variable wavelength optical filter 1 shown in FIG. 1A.

FIG. 2 illustrates a view for explaining operation principle of the variable wavelength optical filter 1 shown in FIG. 1A.

Among the incident lights with an incident angle .theta.1 and wavelength .lamda. (includes different wavelengths in each channel separation .lamda.1, .lamda.2, . . . ), only a light with a wavelength .lamda.=.lamda.1 which satisfies the equation (1) is diffracted by the diffraction grating 14, and hits with incident angle .phi.1 the optical guide layer 15 with a refraction index n1. This angle .phi.1 is determined depending on the period .LAMDA. of the diffraction grating 14, and is represented by the equation (1). Here, only a first order diffraction light is considered.

$$n1 \sin \phi1 - n2 \sin \theta1 = \lambda 1/\Lambda \tag{1}$$

That is, if the propagation angle .PHI.1 of the single mode allowable to transmit in the optical guide layer 15 and a diffraction angle .phi.1 of an incident light diffracted by the diffraction grating 14 given by the equation (1) are coincide with each other (.phi.1=.PHI.1), the incident light couples a single mode propagating in the optical guide layer 15, and its total energy is radiated into the single mode, and the light travels in zigzag inside the optical guide layer 15 along its layer direction. As the light propagates in zigzag, the single mode propagating inside the optical guide layer 15 with an angle .phi.1=.PHI.1 is affected by the diffraction grating 14 at the cladding layer 13 side, successively diffracts the light with a wavelength .lamda.1 to the direction opposite to the incident light, with an angle of −.theta.1, and thereby extinguishes gradually. This diffracted light exits as a reflected light with a wavelength of .lamda.1 to the direction opposite to the incident direction, with an angle of −.theta.1.

On the other hand, incident lights with a wavelength .lamda.2, .lamda.3 . . . (.noteq..lamda.1) can't propagate inside the optical guide layer 15, and they exit as transmitted lights from the rear surface of the silicon substrate 12, since their diffraction angles phi.2, phi.3 . . . don't coincide with the propagation angle .PHI.1 of the single mode propagating inside the optical guide layer 15 (.phi.2.noteq..PHI.1, .phi.3.noteq..PHI.1, . . . ).

Here, by applying voltage between the silicon substrate side electrical terminal 22 and glass substrate side electrical terminal 23 shown in FIG. 2, the direction of the orientation of the liquid crystal molecules of the liquid crystal layer 17 changes, and correspondingly the refraction index n2 varies. As a result, the propagation angle .PHI.1 of the single mode propagating inside the light transmitting layer 15 varies, at a certain voltage V2, the propagation angle of the single mode changes to .PHI.2, and then changes to coincide with the diffraction angle .phi.2 of the light with a wavelength of .lamda.2 (.phi.2=.PHI.2). Thereby, the incident light with a wavelength .lamda.2 couples to the single mode propagating inside the light transmitting layer 15 and transfers its total energy to the mode, diffracts a light with a wavelength .lamda.2 (.noteq..lamda.1) through influence of the diffraction grating 14, and thereby becomes a reflected light. In case of applying voltage V2, the aforementioned light with a wavelength of .lamda.1 is not allowed to propagate inside the optical guide layer 15, and thereby exits as a transmitted light from the rear surface of the silicon substrate 12.

Figure 3:
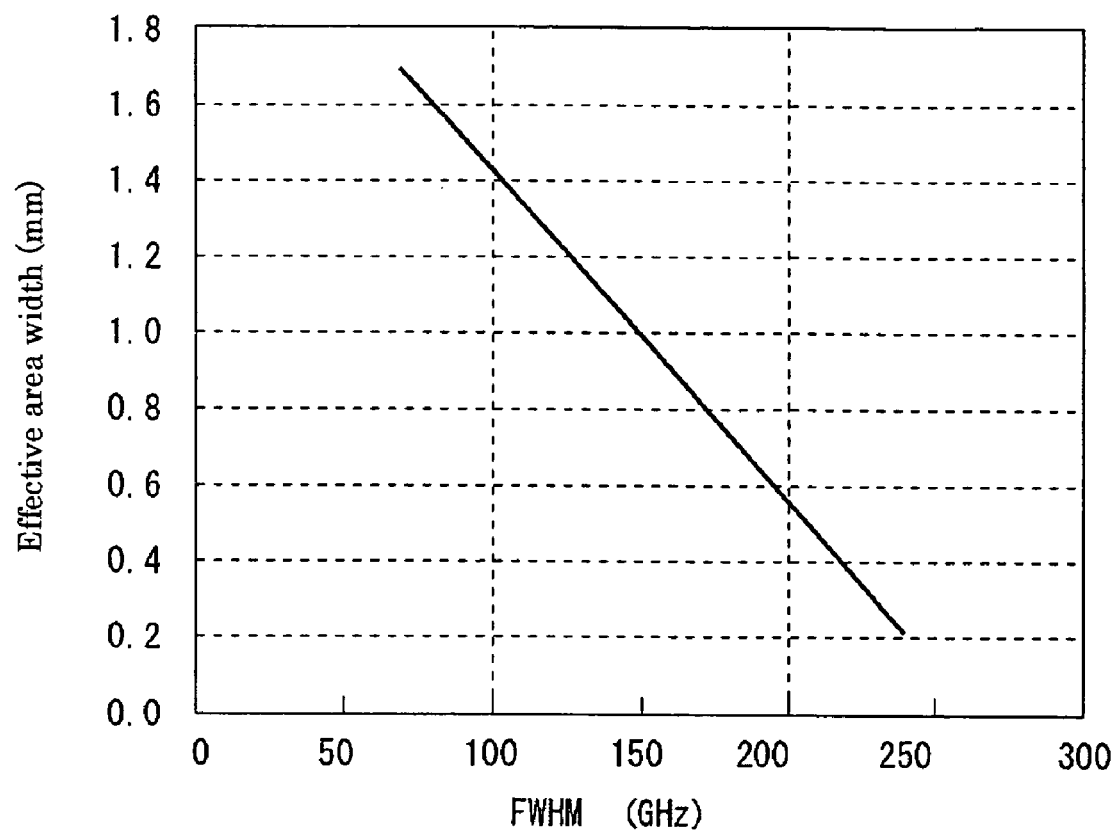
FIG. 3 illustrates a graph showing the relationship between the effective area width of the variable wavelength optical filter achievable reflectivity of more than or equal 98% and FWHM of the reflectivity.

Next, referring to the FIG. 3, description is made on the effective area width of the variable wavelength optical filter according to the present invention.

As illustrated in FIG. 2, after the incident light is diffracted by the diffraction grating, it travels in zigzag inside the optical guide layer along its layer direction, the larger the number of the zigzag turns is, the more the diffracted and reflected light is, and thereby stronger reflection power is obtainable. Namely, the wider the effective area width of the variable wavelength optical filter is, the closer to 100% the reflectivity at the wavelength is, and optical filter is achievable which transmits lights with the other wavelengths and has high sensitivity. In general, the reflectivity of the variable wavelength optical filter has a little broadness with respect to the wavelength. This broadness has a Lorentzian distribution, and is dominantly defined based on the depth and width of grooves of the diffraction grating 14. The width of broadness at half height of the maximum reflectivity is defined particularly as FWHM (Full Width Half Maximum).

FIG. 3 illustrates a graph showing the relationship between the effective area width of the variable wavelength optical filter achievable reflectivity of more than or equal 98% and FWHM of the reflectivity. Presently, in order to respond to the increase of amount of the communication information, the wavelength division multiplexing system with a gap of 50 GHz between the adjacent wavelength channels has been developing. Then, corresponding to this channel gap of 50 GHz, FWHM of the variable wavelength optical filter is defined to be less than or equal to 100 GHz.

Based on the graph shown in FIG. 3, in case of FWHM less than or equal to 100 GHZ, more than or equal to 1.3 mm is necessary for the effective area width of the variable wavelength optical filter (this point has also limited the reduction of height and width of the variable wavelength optical filter). Namely, it is suggested that when applying this variable wavelength optical filter to a wavelength-selection optical switch, more than or equal to 1.3 mm is necessary for the width of the filter area of the variable wavelength optical filter and its incident beam must be enlarged to have a diameter of more than or equal to 1.3 mm. Relevantly, referring to FIG. 3, it can be seen that if the diameter of the incident beam is supposed to be 0.5 mm, FWHM exceeds 200 GHz, then not only energy of a light signal with wavelength of .lamda.1 is extracted but also a portion of energy of a light signal with a wavelength .lamda.2 is extracted, and thereby the optical switch doesn't work. It can also be seen that, in case of FWHM of 100 GHz, if the diameter of the incident beam is supposed to be 0.5 mm, the reflectivity of more than or equal to 98% is not achievable and an enough high extinction ratio is not accomplished.

According to the variable wavelength optical filter of the present invention, it is possible to ensure an enough wide effective area width of more than or equal to 1.3 mm, thereby to achieve narrow FWHM, and to realize simultaneously considerable miniaturization.

Figure 4:
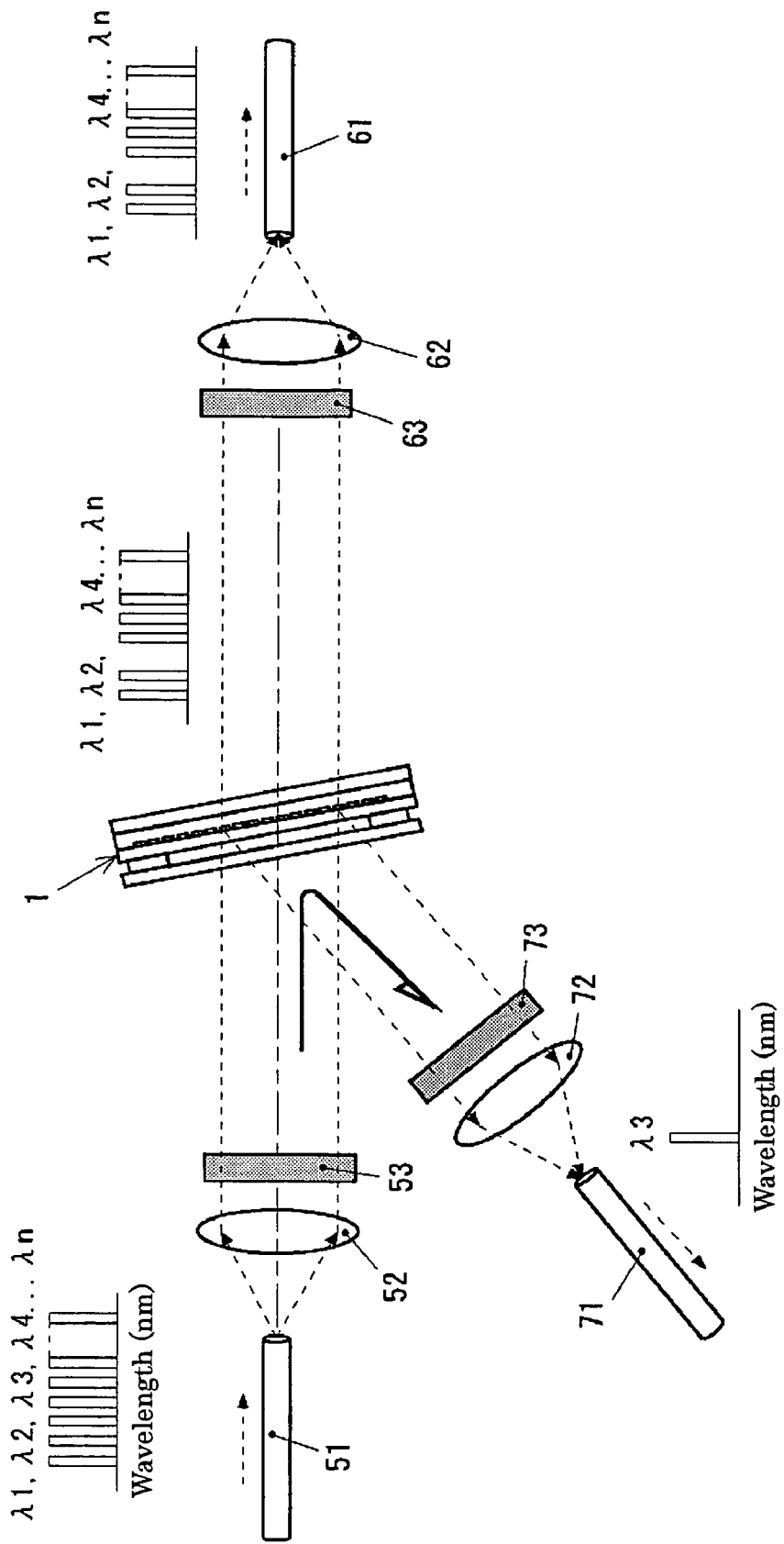
FIG. 4 illustrates a view schematically showing an exemplified configuration of the optical switch, which is the variable wavelength optical filter shown in FIG. 1A, and the optical add/drop multiplexer using this.

FIG. 4 illustrates a view schematically showing an exemplified configuration of the optical switch 31, which is the variable wavelength optical filter shown in FIG. 1A, and the optical add/drop multiplexer 40 using this. However, the present exemplified configuration has only a functional of dropping light. Although the configuration of an optical system with the optical switch 31 (variable wavelength optical filter) arranged to be tilted is shown as the present example of the configuration, it is also possible to employ the configuration of an optical system with the collimator lenses 52, 62, and 72 aligned off-axis and light beam tilted.

A light beam with wavelengths of .lamda.1, .lamda.2, .lamda.3, .lamda.4 . . . exiting the single mode optical fiber 51 at the input side is widened, in order to achieve an enough high reflectivity at the optical switch 31, its diameter to more than or equal to 1.3 mm and collimated, by the collimator lens 52.

The collimated light is transformed to the linearly polarized light by the polarization control element 53 such as a Glan-Thompson prism, and then is directed to the optical switch 31. At the optical switch 31, depending on the applied voltage V, a light with a certain wavelength (in FIG. 4, voltage V3 for wavelength .lamda.3) is diffracted and reflected, and the whole rest components transmit through the optical switch 31. In this case, the polarization control element 63 is not necessarily required.

The transmitted light with wavelength .lamda.1, .lamda.2, .lamda.4 . . . is injected into the first-output single mode optical fiber 61 via the polarization control element 63 such as Glan-Thompson prism and then collimator lens 62, and outputs as an output optical signal with wavelengths of .lamda.1, .lamda.2, .lamda.4 . . .

On the other hand, the diffracted and reflected light with a wavelength of .lamda.3 is injected into the second-output single mode optical fiber 61 via the polarization control element 73 such as Glan-Thompson prism and then collimator lens 72, and outputs as an output signal with wavelength of .lamda.3. In this case, the polarization control element 73 is not necessarily required. Hereby, this system works as the wavelength-selection optical switch able to select and extract a light with a certain wavelength. This is the drop functionality of light.

Figure 5:
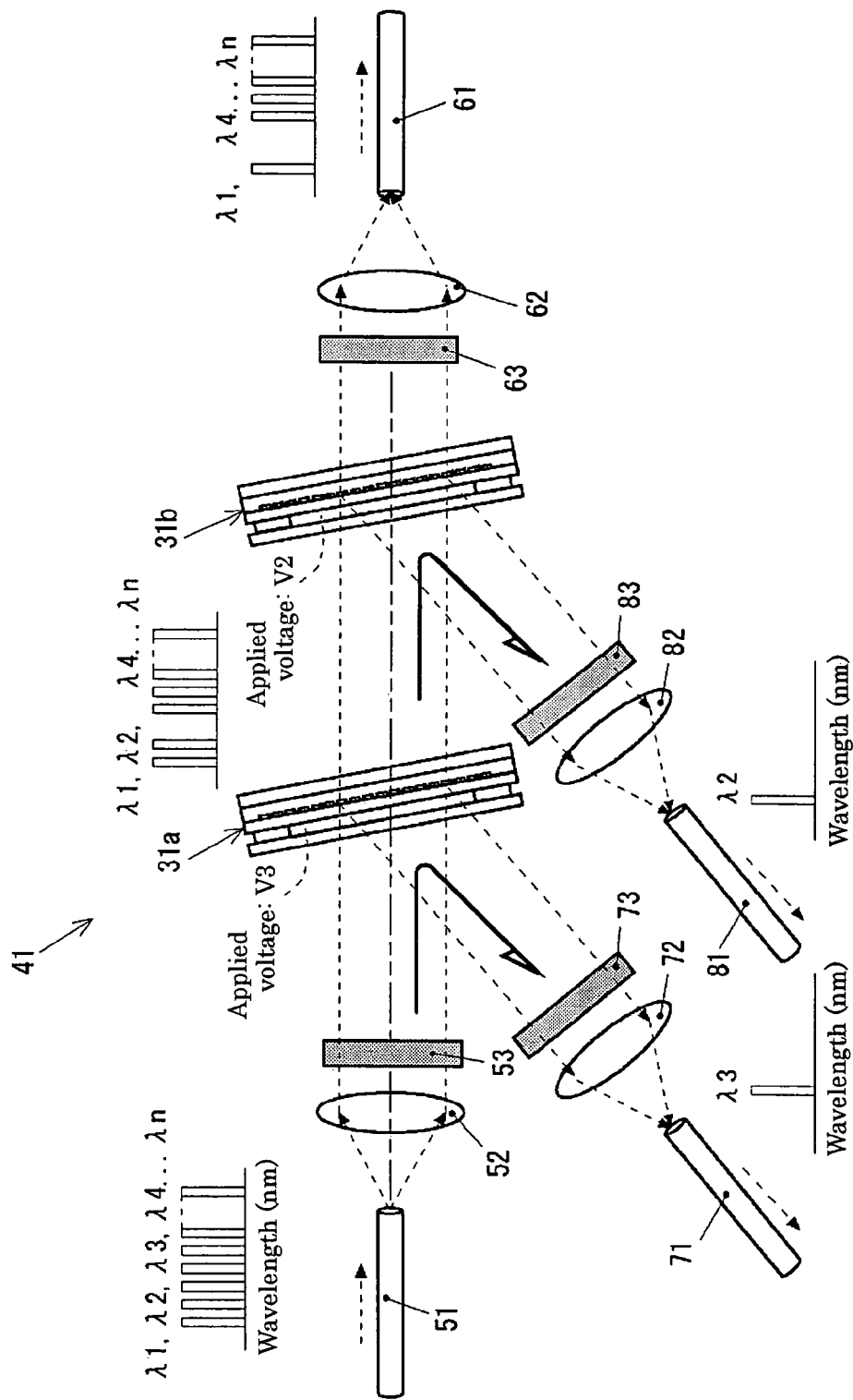
FIG. 5 illustrates a view schematically showing another exemplified configuration of two optical switches which are the variable wavelength optical filters shown in FIG. 1A, and optical add/drop multiplexer using them.

FIG. 5 illustrates a view schematically showing another exemplified configuration of two optical switches 31a, 31b, which are the variable wavelength optical filters shown in FIG. 1A, and optical add/drop multiplexer 41 using them. As shown, by aligning a plurality of optical switches and applying the applied voltage corresponding to the desired wavelength (in FIG. 5, voltage V3 for wavelength .lamda.3, and voltage V2 for wavelength .lamda.2) to the optical switches 31a, 31b respectively, it is easy to achieve the functional of dropping light for multi-channel.

Figure 6:
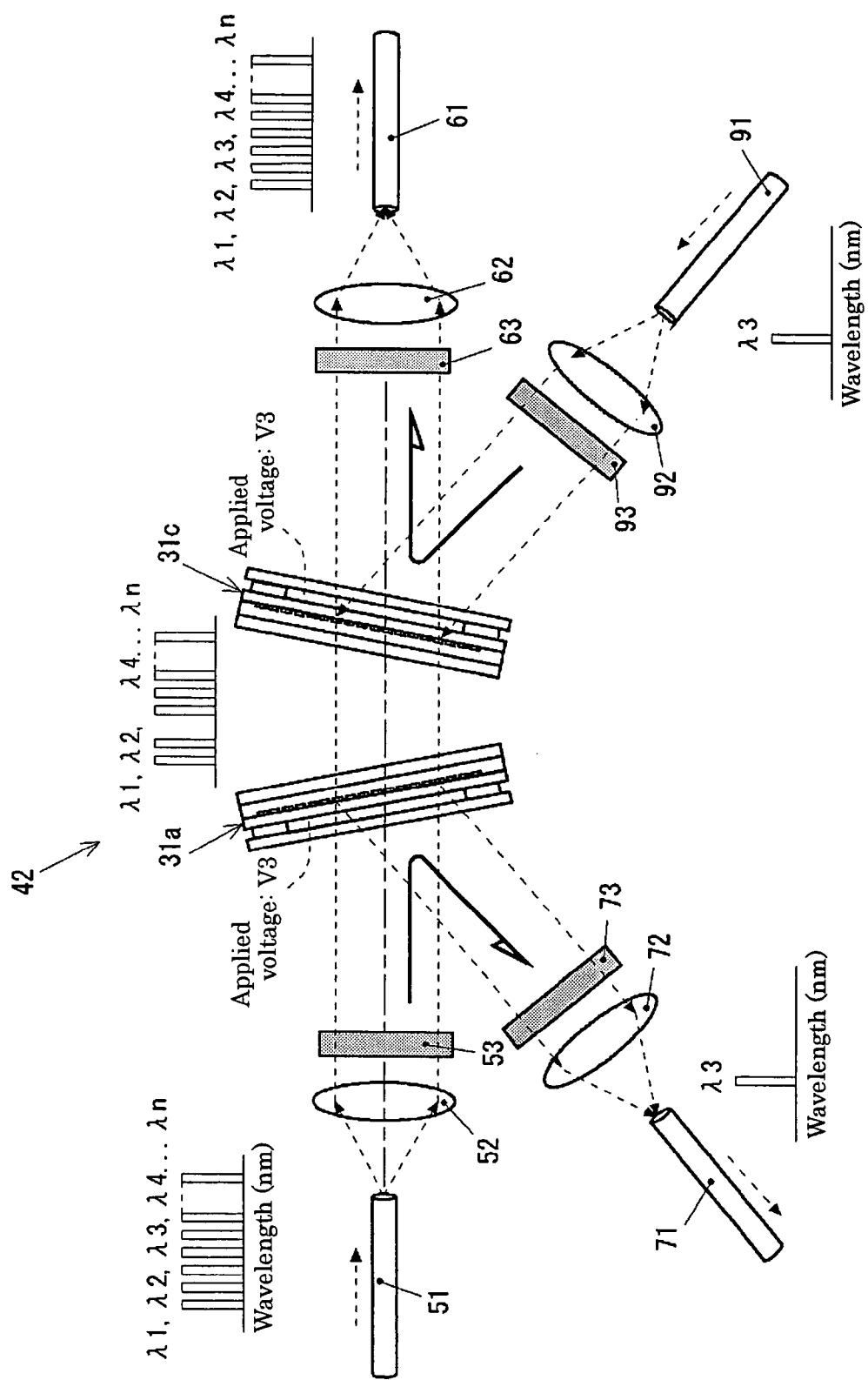
FIG. 6 illustrates a view schematically showing yet another exemplified configuration of two optical switches which are the variable wavelength optical filters shown in FIG. 1A, and optical add/drop multiplexer using them.
Figure 7:
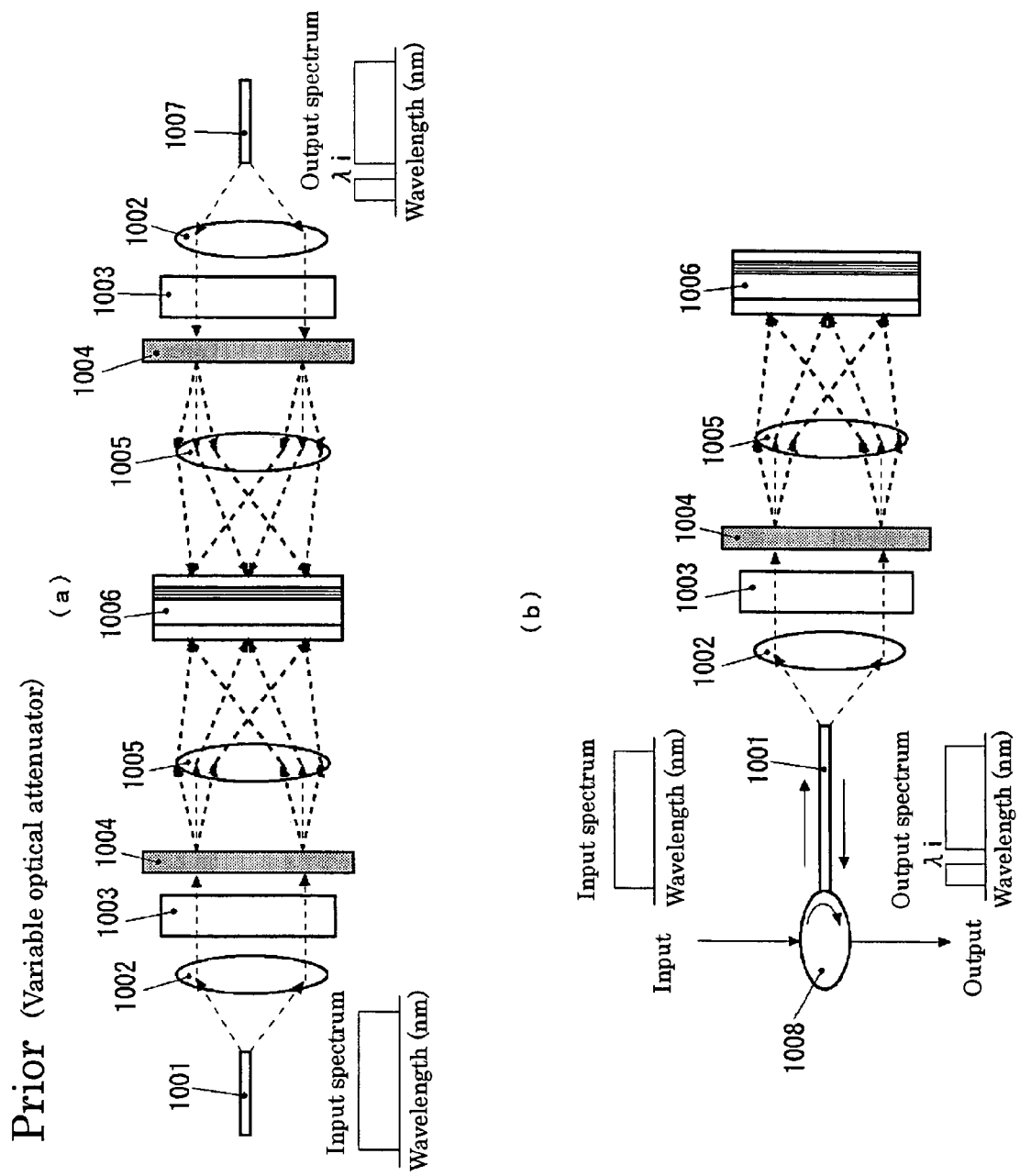
FIGS. 7 (*a*) and (*b*) illustrate views schematically showing an exemplified configuration of the variable optical attenuator (wavelength blocker) of the prior art, respectively.

FIG. 6 illustrates a view schematically showing another exemplified configuration of two optical switches 31a, 31c, which are the variable wavelength optical filters shown in FIG. 1A, and optical add/drop multiplexer 42 using them. In FIG. 6, two optical switches 31a, 31c are aligned almost symmetrically with respect to the plane perpendicular to the optical axis.

The incident beam with a wavelength .lamda.3 inputted from the single mode optical fiber 51 at the first input side is widened, in order to achieve an enough high reflectivity at the optical switch 31a, its diameter to more than or equal to 1.3 mm and collimated, by the collimator lens 52. This collimated light is transformed to a linearly polarized light by the polarization control element 53 such as Glan-Thompson prism, and then is directed to the optical switch 31a. At the optical switch 31a, a light with a wavelength .lamda.3 is diffracted and reflected through adjusting the applied voltage, and the other component with wavelength .lamda.1, .lamda.2, .lamda.4 . . . transmits through the optical switch 31a.

On the other hand, incident beam with a wavelength .lamda.3 from the single mode optical fiber 91 at the second input side is widened, in order to achieve enough high reflectivity at the optical switch 31c, its diameter to more than or equal to 1.3 mm and collimated, by the collimator lens 92. This collimated light is transformed to a linearly polarized light by the polarization control element 93 such as Glan-Thompson prism, and then is directed to the optical switch 31c. A light with a wavelength .lamda.3 is diffracted and reflected by the optical switch 31c, joined with other optical beam with wavelength .lamda.1, .lamda.2, .lamda.4 . . . , injected to the single mode optical fiber 61 at the output side via polarization control element 63 such as Glan-Thompson prism and then collimator lens 62, and outputs as a wavelength multiplexed exiting optical signal with wavelengths .lamda.1, .lamda.2, .lamda.3, .lamda.4 . . . .lamda.n. In this case, the polarization control element 63 is not necessarily required. Thereby, it is possible to work as a wavelength-selection optical switch which selects light with a certain wavelength and inserts, that is, joins. This is the add functionality of light.

For the multi-channel configuration, it is easy to contemplate that it is achievable by arranging a plurality of optical switches. Also, although regarding the optical add/drop multiplexer shown in FIG. 6, wavelength-selection optical switches are symmetrically arranged, they are not necessary to be symmetrically arranged, and it is also possible to connect using a single mode optical fiber.

What is claimed is:

1. An optical switch comprising: a silicon substrate; a glass substrate arranged to face a surface of said silicon substrate and having a transparent electrode layer in its opposing surface; a light diffraction reflection layer aligned on a surface of said silicon substrate; a liquid crystal layer aligned between said light diffraction layer and said transparent electrode layer; a silicon substrate electrical terminal extracted from a rear surface of said silicon substrate; and a means for applying voltage between said transparent electrode layer and said silicon substrate electrical terminal; wherein wavelength of light diffracted and reflected by said light diffraction reflection layer may be selected by controlling the refraction index of said liquid crystal layer through said voltage; and wherein the height of said optical switch is no more than about 3 mm and the width of said optical switch is no more than about 4.5 mm.

2. The optical switch of claim 1, wherein the height of said optical switch is no more than 3 mm and the width of said optical switch is no more than 4.5 mm.

3. An optical add/drop multiplexer which comprises: a collimator lens for widening a beam diameter of a wavelength multiplexed optical signal; and the optical switch of claims 1 or 2 for receiving said wavelength multiplexed optical signal with widened beam diameter; wherein an optical signal with wavelength selected depending on a voltage applied to said optical switch from said wavelength multiplexed optical signal is diffracted and reflected by said optical switch.

4. An optical add/drop multiplexer which comprises: a first collimator lens for widening a beam diameter of a wavelength multiplexed optical signal; a second collimator lens for widening a beam diameter of an optical signal with a certain wavelength; and the optical switch of claims 1 or 2 for receiving said wavelength multiplexed optical signal with widened beam diameter and said optical signal with a certain wavelength; wherein said optical signal with the certain wavelength is diffracted and reflected by setting the voltage applied to said optical switch in order to select said certain wavelength, and said optical signal with the certain wavelength is joined to said wavelength multiplexed optical signal.

5. The optical add/drop multiplexer of claim 3; wherein said collimator lens widens the beam diameter to at least about 1.3 mm.

* * * * *